(12) United States Patent
Payne

(10) Patent No.: US 11,016,287 B2
(45) Date of Patent: May 25, 2021

(54) HIGH ÉTENDUE SPATIAL LIGHT MODULATOR

(71) Applicant: SILICON LIGHT MACHINES CORPORATION, Sunnyvale, CA (US)

(72) Inventor: Alexander Payne, Ben Lomond, CA (US)

(73) Assignee: SILICON LIGHT MACHINES CORPORATION, Sunnyvale, CA (US)

( * ) Notice: Subject to any disclaimer, the term of this patent is extended or adjusted under 35 U.S.C. 154(b) by 116 days.

(21) Appl. No.: 16/184,303

(22) Filed: Nov. 8, 2018

(65) Prior Publication Data
US 2020/0026066 A1   Jan. 23, 2020

(51) Int. Cl.
| | | |
|---|---|---|
| *G02B 26/08* | (2006.01) |
| *B33Y 30/00* | (2015.01) |
| *B29C 64/135* | (2017.01) |
| *B29C 64/268* | (2017.01) |
| *B22F 10/20* | (2021.01) |

(52) U.S. Cl.
CPC .......... *G02B 26/0841* (2013.01); *B22F 10/20* (2021.01); *B29C 64/135* (2017.08); *B29C 64/268* (2017.08); *B33Y 30/00* (2014.12); *G02B 26/0808* (2013.01)

(58) Field of Classification Search
CPC .. G02B 26/001; G02B 26/08; G02B 26/0808; G02B 26/0833; B81B 3/0097; B81B 2201/04; B81B 2201/042; B81B 2201/047
See application file for complete search history.

(56) References Cited

U.S. PATENT DOCUMENTS

| | | |
|---|---|---|
| 5,459,610 A | 10/1995 | Bloom et al. |
| 6,144,481 A | 11/2000 | Kowarz et al. |

(Continued)

FOREIGN PATENT DOCUMENTS

JP   PCT/JP2010/068246   10/2010

OTHER PUBLICATIONS

International Search Report for International Application PCT/US19/60481 dated Nov. 8, 2019.

(Continued)

*Primary Examiner* — Robert E. Tallman
(74) *Attorney, Agent, or Firm* — William Nuttle

(57) ABSTRACT

A spatial light modulator (SLM) having improved étendue, and methods of fabricating and operating the same are described. Generally, the SLM includes pixels each including a tensile membrane suspended over a surface of a substrate by posts at corners thereof. The tensile membrane includes an electrostatically deflectable piston and flexures through which the piston is coupled to the posts. A platform having first light reflective surfaces is supported above and separated from the piston by one or more central posts extending from the piston to the platform, and a face-plate including a second light reflective surface is suspended over the platform. The face-plate includes plurality of apertures through which the first light reflective surfaces are exposed. Electrostatic deflection of the piston brings light reflected from the first light reflective surfaces into constructive or destructive interference with light reflected from the second light reflective surface. Other embodiments are also described.

14 Claims, 12 Drawing Sheets

(56) References Cited

U.S. PATENT DOCUMENTS

| | | | |
|---|---|---|---|
| 7,064,883 B2* | 6/2006 | Payne | G02B 26/001 |
| | | | 359/290 |
| 8,404,173 B2* | 3/2013 | Cregger | B29C 64/135 |
| | | | 264/401 |
| 2003/0095318 A1 | 5/2003 | DiCarlo et al. | |

OTHER PUBLICATIONS

Written Opinion of International Searching Authority Application PCT/US19/60481 dated Nov. 8, 2019.

* cited by examiner

HIGH ÉTENDUE SPATIAL LIGHT MODULATOR

TECHNICAL FIELD

The present invention relates generally to Micro-Electro-Mechanical Systems devices, and more particularly to diffractive spatial light modulators having high étendue and methods of fabricating the same.

BACKGROUND

Micro-Electro-Mechanical Systems or MEMS devices are a category of devices formed by integrating mechanical elements, sensors, actuators, and electronics onto a common or shared substrate using semiconductor fabrication techniques. Diffractive spatial light modulators (SLM) are one type of MEMS device finding increasing use in various applications, including display systems, printing, maskless lithography, three dimensional (3D) printing, selective laser melting, sintering, and oxidation or ablation of a material on a workpiece.

Generally, a diffractive SLM includes a number of diffractors or modulators, each including a first light reflective surface on a top surface of a fixed structure suspended over a substrate, such as a face-plate or static ribbon, and a second light reflective surface over a top surface of electrostatically deflectable element suspended over the substrate adjacent to the first surface. In operation, a voltage applied between an electrode in the deflectable element and an electrode in the substrate provided by a drive circuit integrally formed in the substrate underlying (i.e. integrated) or adjacent to the first and second light reflective surfaces (i.e. non-integrated) causes the deflectable element to be deflected towards the substrate. The first and second light reflective surfaces have equal area and reflectivity so that in operation deflection of the electrostatically deflectable element brings light reflected from the first light reflective surface into constructive or destructive interference with light reflected from the second light reflective surface.

A figure of merit used to characterize the performance of a SLM étendue. In optics, étendue refers the "extent" or how "spread out" the light is in area and angle. High étendue SLMs are desirable as accepting more illumination and providing higher output brightness and contrast. One problem with diffractive SLMs in general, and those including electrostatically deflectable elements in particular, is that the étendue of a diffractive SLM is limited by the pitch of spatial features of the modulator, i.e., a spacing of repeating reflective surfaces, relative to an illumination wavelength. Thus, to achieve high étendue it is desirable that a size of the modulators be reduced so that the spatial periods or pitch of the SLM can be reduced. However, as the size of the modulator decreases, a voltage required to move or drive the electrostatically deflectable elements increases sharply, requiring the use of larger, high voltage circuitry in the drive circuit.

This disclosure describes MEMS structure for achieving high étendue while preserving or maintaining a lower drive voltage and smaller transistor footprint area for the drive circuit.

SUMMARY

A Micro-Electro-Mechanical Systems (MEMS) based spatial light modulator (SLM) having improved Étendue, and methods of fabricating and operating the same are described.

In a first aspect, the SLM includes a number of pixels each including a tensile membrane suspended over a surface of a substrate by corner posts at corners thereof. The tensile membrane includes an electrostatically deflectable piston and flexures through which the piston is coupled to the posts. The pixel further includes a platform having a number of first light reflective surfaces on or over a top surface of the platform, and supported above and separated from the piston by a central post (or arrangement of a number of posts) extending from the piston to a lower surface of the platform. The pixel further includes a face-plate having a second light reflective surface on a top surface thereof suspended over the platform. The face-plate includes multiple or a plurality of apertures through which the first light reflective surfaces are exposed. Electrostatic deflection of the piston brings light reflected from the first light reflective surfaces into constructive or destructive interference with light reflected from the second light reflective surface. Generally, a pitch of pixels in the array provides a spatial frequency of the pixels in the array that is low relative to a spatial frequency of the diffractors in each pixel. For example, in some embodiments the spatial period ($\Lambda$) of the multiple diffractors within a single pixel can be from about 2-200 times the spatial frequency of the pixels in the array. In some embodiments, the spatial period ($\Lambda$) of the multiple diffractors within a single pixel is a multiple n of a wavelength ($\lambda$) of light incident on the SLM, wherein n ranges from 1-200.

In other embodiments the SLM further includes multiple or a plurality of drivers formed in the substrate underlying or adjacent to the array of pixels, and each pixel is driven by one of the multiple drivers, and a pitch of the multiple drivers is equal to the pitch of the pixels in the array.

In another aspect, a method for operating a MEMS based SLM having improved Étendue is provided. Generally, the method includes or involves steps of causing a beam of light to impinge upon an array of pixels, each pixel including multiple diffractors, each diffractor including a first light reflective surface having a multiple apertures formed therein, and a second light reflective surface parallel to the first light reflective surface and positioned relative to the apertures to receive light passing therethrough. Next, the second light reflective surfaces of each of the multiple diffractors in at least one of the pixels are moved relative to the first light reflective surface in unison and by a uniform distance equal to a multiple of a quarter wavelength ($\lambda/4$) of the beam of light.

Generally, as in the embodiments of the SLM described above each pixel includes a tensile membrane suspended over a surface of a substrate by posts at corners thereof, the tensile membrane including an electrostatically deflectable piston and a number of flexures through which the piston is coupled to the posts, a platform over which the second light reflective surface are formed supported above and separated from the piston by a central post (or arrangement of a number of posts) extending from the piston to the platform, and a face-plate including the first light reflective surface suspended over the platform. Each diffractor includes one of the apertures and a portion of the first light reflective surface surrounding and immediately adjacent to the aperture, and moving the second light reflective surfaces includes electrostatically deflecting the piston to move the second planar light reflective surface of each of the diffractors in the pixel uniformly and in unison relative to the first planar light reflective surface while maintaining the second planar light reflective surface substantially parallel to the first planar light reflective surface.

In some embodiments, moving the second light reflective surfaces includes moving the second light reflective surfaces by an odd multiple of the λ/4 of the beam of light to modulate an intensity or magnitude of light reflected from the modulator. In other embodiments, the second light reflective surfaces are moved by an even multiple of the λ/4 of the beam of light to modulate a phase of light reflected from the modulator.

BRIEF DESCRIPTION OF THE DRAWINGS

Embodiments of the present invention will be understood more fully from the detailed description that follows and from the accompanying drawings and the appended claims provided below, where:

DETAILED DESCRIPTION

Embodiments of a Micro-Electromechanical System (MEMS) based diffractive spatial light modulator (SLM) for achieving high étendue while preserving or maintaining a lower drive voltage and smaller transistor footprint area for the drive circuit and methods of manufacturing the same are described herein with reference to figures. However, particular embodiments may be practiced without one or more of these specific details, or in combination with other known methods, materials, and apparatuses. In the following description, numerous specific details are set forth, such as specific materials, dimensions and processes parameters etc. to provide a thorough understanding of the present invention. In other instances, well-known semiconductor design and fabrication techniques have not been described in particular detail to avoid unnecessarily obscuring the present invention. Reference throughout this specification to "an embodiment" means that a particular feature, structure, material, or characteristic described in connection with the embodiment is included in at least one embodiment of the invention. Thus, the appearances of the phrase "in an embodiment" in various places throughout this specification are not necessarily referring to the same embodiment of the invention. Furthermore, the particular features, structures, materials, or characteristics may be combined in any suitable manner in one or more embodiments.

The terms "over," "under," "between," and "on" as used herein refer to a relative position of one layer with respect to other layers. As such, for example, one layer deposited or disposed over or under another layer may be directly in contact with the other layer or may have one or more intervening layers. Moreover, one layer deposited or disposed between layers may be directly in contact with the layers or may have one or more intervening layers. In contrast, a first layer "on" a second layer is in contact with that second layer. Additionally, the relative position of one layer with respect to other layers is provided assuming operations deposit, modify and remove films relative to a starting substrate without consideration of the absolute orientation of the substrate.

Figure 1A:
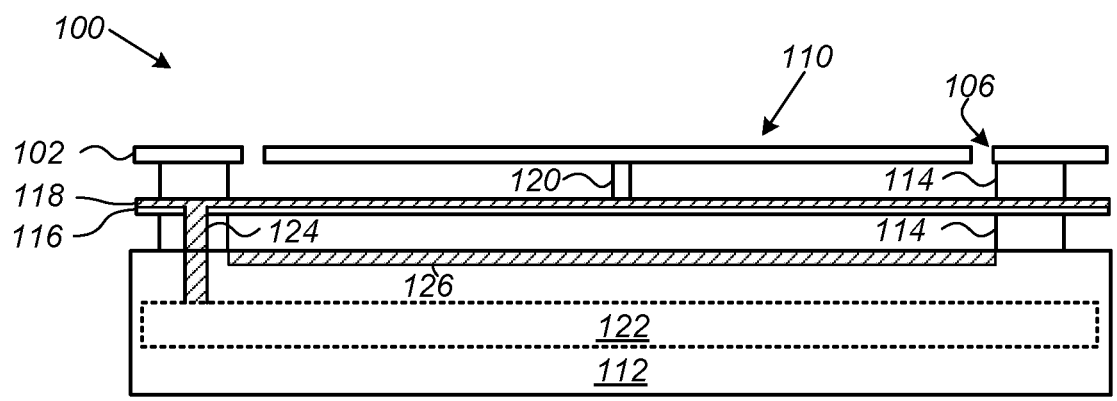
FIG. 1A is a schematic cross-section of a single modulator of a MicroElectroMechanical System (MEMS) based, diffractive spatial light modulator (SLM) in a quiescent or undriven state.
Figure 1B:
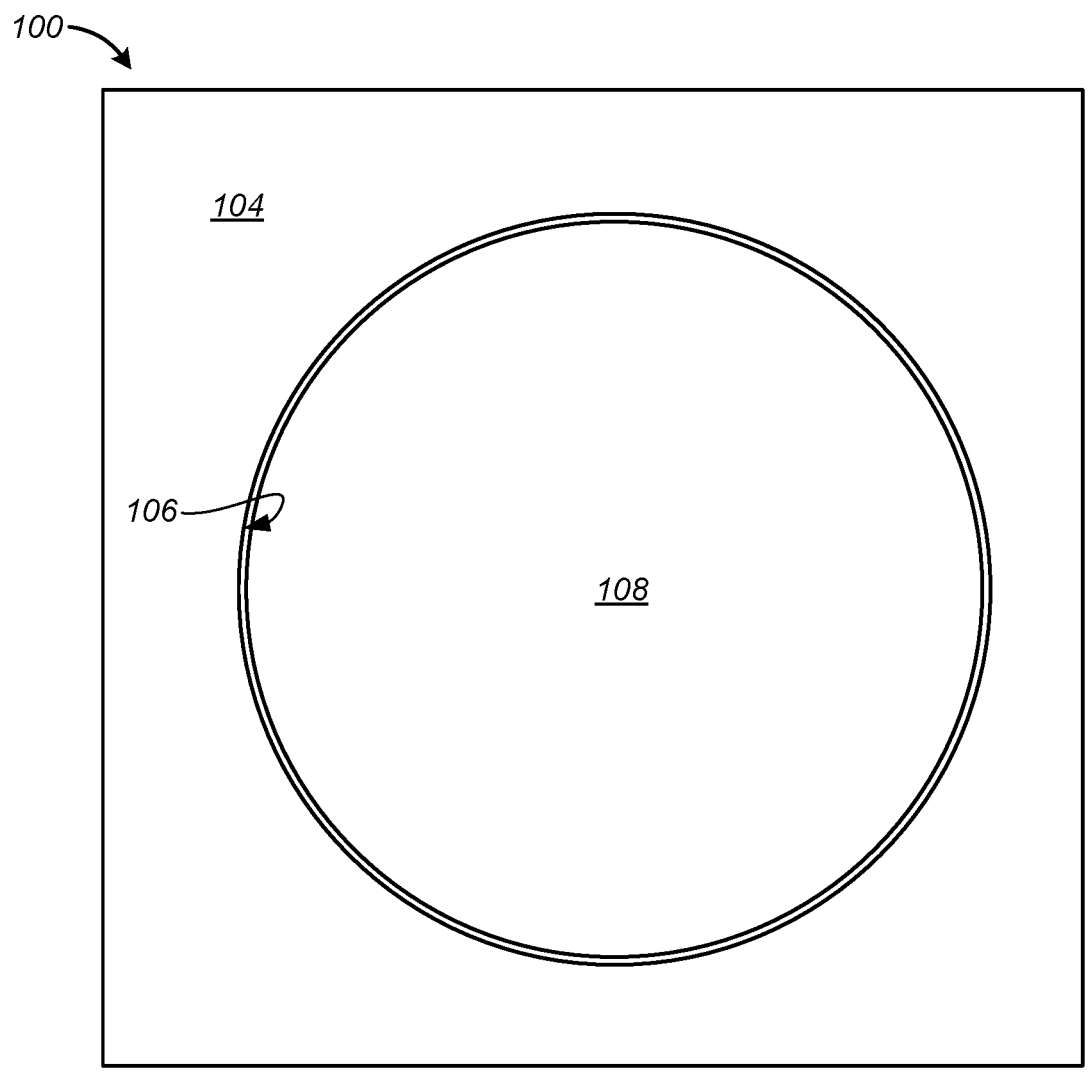
FIG. 1B is a schematic top view of the modulator of FIG. 1A.
Figure 1C:
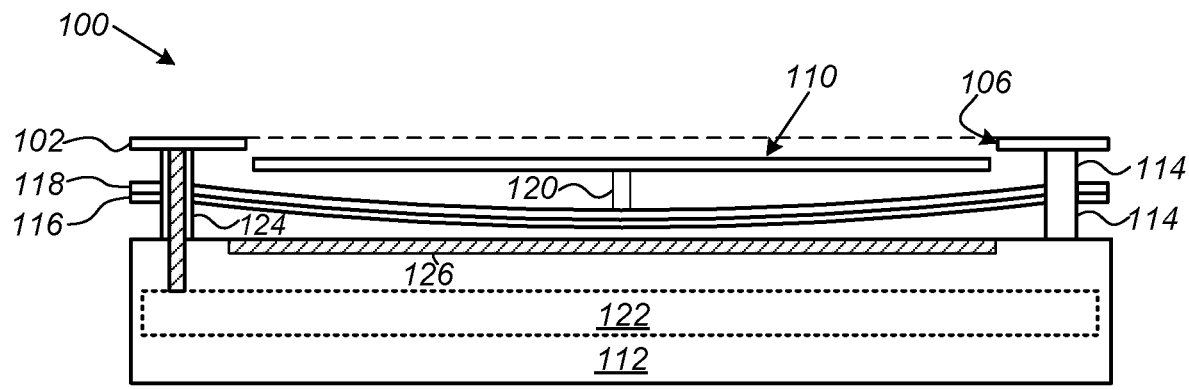
FIG. 1C is a schematic cross-section side view of the modulator of FIG. 1A in a deflected or driven state.

The structure or architecture of the present disclosure is particularly suitable for use with embodiments of MEMs based diffractive SLM such as a Planar Light Valve (PLV™). The PLV™ is a diffractive SLM commercially available from Silicon Light Machines, Inc., of Sunnyvale, Calif. A single modulator or diffractor 100 of an embodiment of a PLV™ is shown in FIGS. 1A-1C, where FIG. 1A is a sectional side view of the modulator in a quiescent or undriven state, FIG. 1B is a top view of the modulator, and FIG. 1C is a sectional side view of the modulator in a deflected or driven state. Although only single modulator is shown in FIGS. 1A-1C it will be understood that a complete diffractive SLM such as the PLV™ generally includes a two-dimensional array of multiple diffractor diffractors operated to modulate light incident thereon. A typical PLV™ can include from $10^3$ to about $10^7$ diffractors 100, arranged in a columns and rows in the array.

Referring to FIGS. 1A and 1B, each individual diffractor 100 includes a portion of a static tent member or face-plate 102 having a first reflector or light reflective surface 104 formed thereon, and an aperture 106 through which a second reflector or light reflective surface 108 of an electrostatically deflectable actuator or piston 110 is exposed. The size and position of the aperture 106 is chosen to satisfy an "equal reflectivity" constraint. That is the area of the second light reflective surface 108 exposed by the aperture 106 is substantially equal to the reflectivity of the area of the first light reflective surface 104 of the face-plate 102 of the individual diffractor 100 outside the aperture 106.

The face-plate 102 is supported above a surface of a substrate 112 by one or more posts 114 by at corners of the diffractor 100, and can be formed solely by layers forming the first light reflective surface 104. Alternatively the face-plate 102 can further include a uniform, planar sheet of a dielectric or semiconducting material, for example a taut silicon-nitride or silicon-germanium layer, over which the first light reflective surface 104 is formed.

In the embodiment shown, the piston 110 further includes in addition to the second light reflective surface 108 a mechanical layer 116 and an actuator electrode or electrode layer 118, which are separated from the second light reflective surface 108 by one or more central posts or supports. In the embodiment shown the actuator/electrode layer 118 is separated from the second light reflective surface 108 by a single central support 120. The mechanical layer 116 can include a taut layer of a material, such as silicon-nitride or silicon-germanium, supported by posts 114 at corners of the diffractor 100. The electrode layer 118 can include a metal or other conductive material, such as a doped poly-crystalline silicon, formed on the mechanical layer 116, and is electrically coupled to an electrical ground or to drive circuit 122 integrally formed in or on the substrate 112 through electrically conductive vias 124 formed in or over one or more of the posts 114.

Referring to FIG. 1C, in operation, the piston 110 is deflected towards a lower electrode 126 formed in or on the substrate 112 by electrostatic forces generated when a voltage is applied between the lower electrode and the electrode layer 118 of the piston 110. Moving the piston 110 brings light reflected from the second light reflective surface 108 into constructive or destructive interference with light reflected by the first light reflective surface 104 of the static or stationary face-plate 102.

Figure 2:
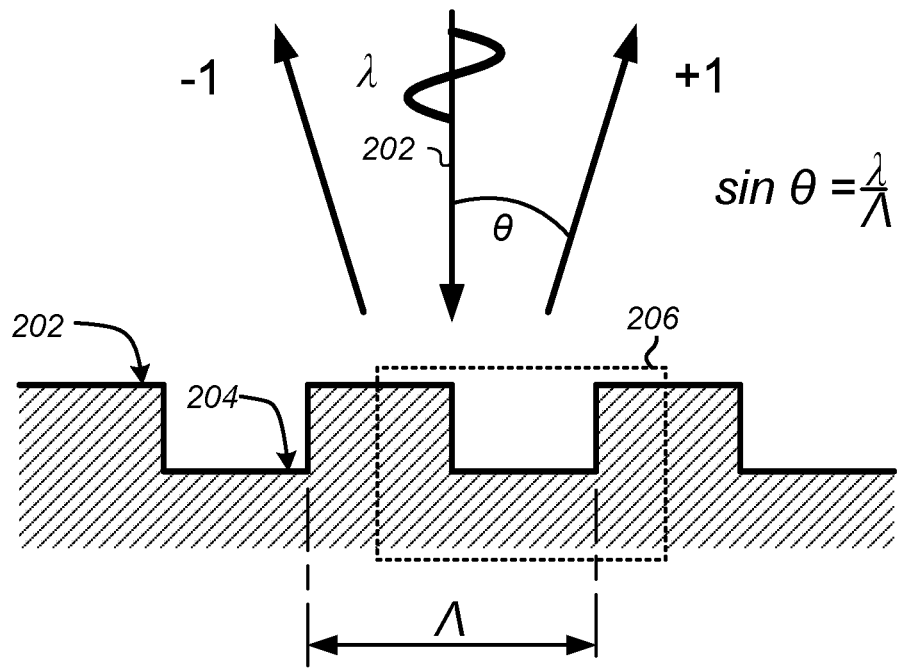
FIG. 2 is a schematic diagram illustrating the effect of pitch or spatial period of modulators in a diffractive SLM relative to wavelength (λ) of a modulated light beam on $1^{st}$ order diffraction angles.

As noted above, high étendue is desirable in diffractive SLMs to provide higher output brightness and improved contrast FIG. 2 is a schematic diagram illustrating the effect of pitch or spatial period of diffractors in a diffractive SLM relative to wavelength ($\lambda$) of a modulated light beam on $1^{st}$ order diffraction angles. Referring to FIG. 2, the $\pm 1^4$ order diffraction angles of periodic surfaces, such as first reflective surfaces 202 and second reflective surfaces 204 in diffractors 206 of a diffractive SLM, are defined by Bragg's Law:

$$\sin \theta = \lambda/\Lambda$$

where $\theta$ is the scattering or diffraction angle of the reflected or modulated light relative to an angle of an incident light, $\lambda$ is a wavelength of the incident light, and $\Lambda$ is the spatial period or pitch of the periodic surface.

Figure 3:
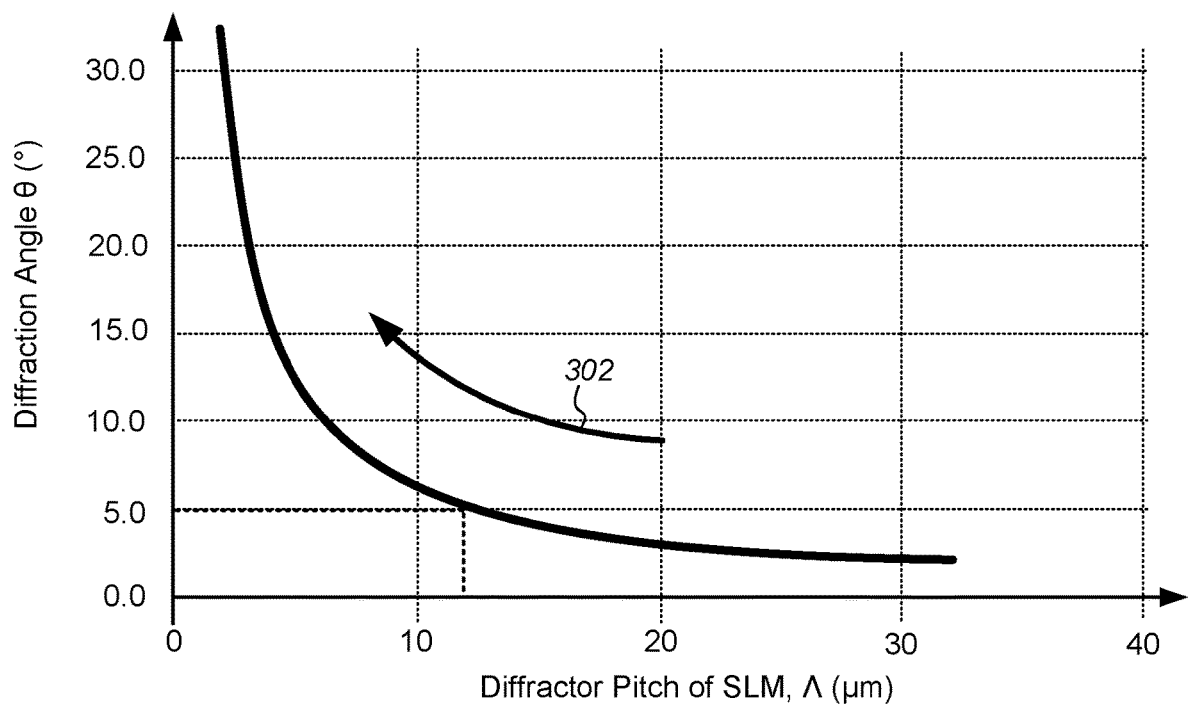
FIG. 3 is a graph illustrating the effect of modulator pitch on diffraction angles for 1064 nm incident light.

FIG. 3 is a graph illustrating the effect of diffractor pitch or spatial period on diffraction angle for a diffractive SLM. Referring to FIG. 3 it is seen that the diffraction angle ($\theta$) scales as an inverse function ($1/\Lambda$) of the diffractor pitch so that as diffractor pitch decreases the diffraction angle ($\theta$) increases as indicated by arrow 302, improving the étendue of the diffractive SLM.

Examples of the resulting diffraction angles ($\theta$) for a diffractive SLM having diffractors spaced apart with different spatial periods or pitches ($\Lambda$) and illuminated with by light having different wavelengths is given in Table I below. Referring to Table I it is noted that for light having wavelengths ($\lambda$) in the near infrared (IR), of from about 355 to about 1064 nanometers (nm), diffractions angles ($\theta$) greater than about 5° requires diffractor pitches ($\Lambda$) of less than about 10 micrometers ($\mu$m).

TABLE I

|  |  | PLV Pitch ($\mu$m) | | | | | | | | | |
|---|---|---|---|---|---|---|---|---|---|---|---|
|  |  | 2 | 3 | 4 | 6 | 8 | 12 | 16 | 20 | 24 | 32 |
| Wavelength (nm) | 355 | 10.2 | 6.8 | 5.1 | 3.4 | 2.5 | 1.7 | 1.3 | 1.0 | 0.8 | 0.6 |
|  | 405 | 11.7 | 7.8 | 5.8 | 3.9 | 2.9 | 1.9 | 1.5 | 1.2 | 1.0 | 0.7 |
|  | 532 | 15.4 | 10.2 | 7.6 | 5.1 | 3.8 | 2.5 | 1.9 | 1.5 | 1.3 | 1.0 |
|  | 808 | 23.8 | 15.6 | 11.7 | 7.7 | 5.8 | 3.9 | 2.9 | 2.3 | 1.9 | 1.4 |
|  | 980 | 29.3 | 19.1 | 14.2 | 9.4 | 7.0 | 4.7 | 3.5 | 2.8 | 2.3 | 1.8 |
|  | 1064 | 32.1 | 20.8 | 15.4 | 10.2 | 7.6 | 5.1 | 3.8 | 3.0 | 2.5 | 1.9 |

Thus, improving or increasing the étendue of a diffractive SLM requires decreasing the pitch and consequently the size of the diffractors. However, as noted above, as the size of the diffractors and spatial period of the SLM decreases, a voltage required to move or drive the electrostatically deflectable elements increases sharply.

Figure 4:
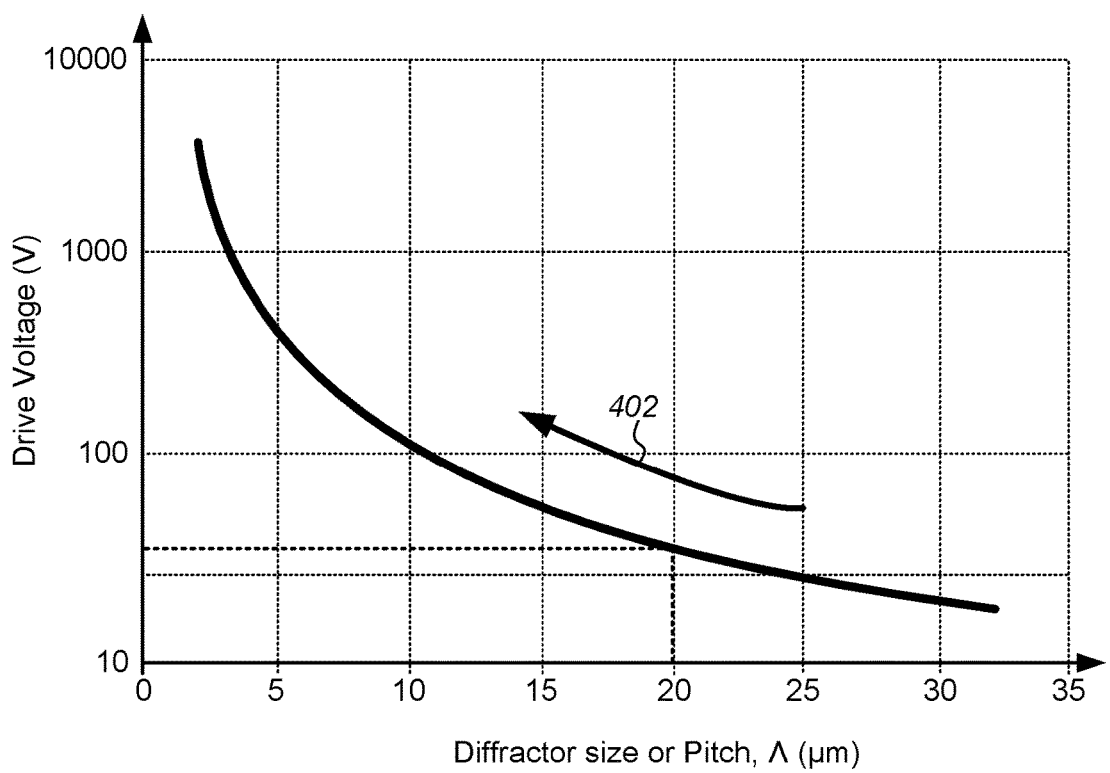
FIG. 4 is a graph illustrating the effect of modulator size or pitch on drive voltage in an electrostatically driven diffractive SLM.

FIG. 4 is a graph illustrating the effect of diffractor size and pitch on drive voltage in an electrostatically driven diffractive SLM. Referring to FIG. 4 it is seen that drive voltage (V) scales as an inverse function ($1/L^{3/2}$) of the diffractor pitch so that as indicated by arrow 402 as diffractor pitch is reduced below about 20 $\mu$m, drive voltages exceed about 50V. Further reductions diffractor pitch result in drive voltages exceeding 1000V.

Table II below provides exemplary required drive voltages (V) for a diffractive SLM having diffractors spaced apart with different spatial periods or pitches ($\Lambda$), where the SLM is illuminated by light having an IR wavelength of about 1000 nm, and where the electrostatically deflectable element is separated from the lower electrode in the substrate by a distance of about 1.25 $\mu$m. Referring to Table II it is noted that diffractive SLM having diffractors with different pitches ($\Lambda$) of 12 $\mu$m or less requiring drive voltages (V) of from about 85V to about 3495V. Although voltages of up to about 100V can be achieved in drive circuits using high voltage (HV) transistors, this is undesirable since such HV transistors typically are square having dimensions of from about 10 to about 40 $\mu$m on a side, and will not fit in the footprint or space underlying an array of diffractors of the diffractive SLM.

TABLE II

| Pitch | 2 | 3 | 4 | 6 | 8 | 12 | 16 | 20 | 24 | 32 |
|---|---|---|---|---|---|---|---|---|---|---|
| Drive Voltage | 3495 | 1347 | 706 | 302 | 174 | 85 | 53 | 37 | 28 | 18 |

Figure 5A:
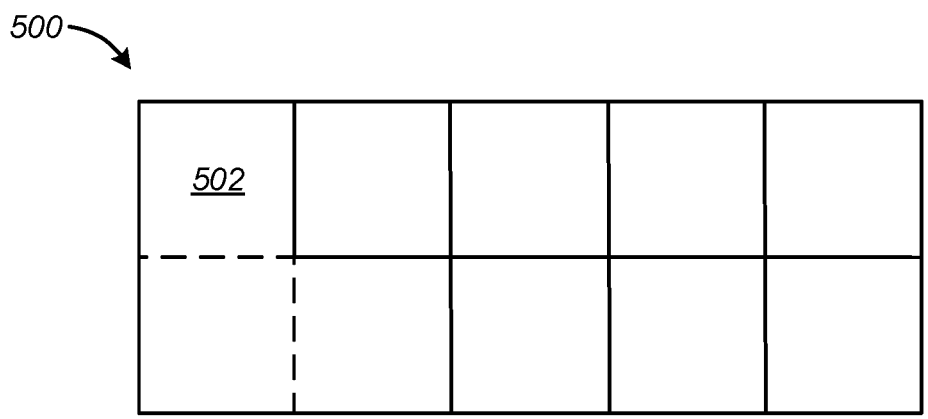
FIG. 5A is a schematic diagram of a top view of a portion of a two-dimensional (2D) array of a diffractive SLM including multiple pixels according to an embodiment of the present disclosure.

FIG. 5A is a schematic block diagram of a top view of a portion of a two-dimensional (2D) array 500 of a diffractive SLM including multiple, individual pixels 502 according to an embodiment of the present disclosure. Referring to FIG. 5A in prior embodiments of a diffractive SLM, such as the PLV™, each pixel can include a single diffractor as shown in FIGS. 1A-1C.

Figure 5B:
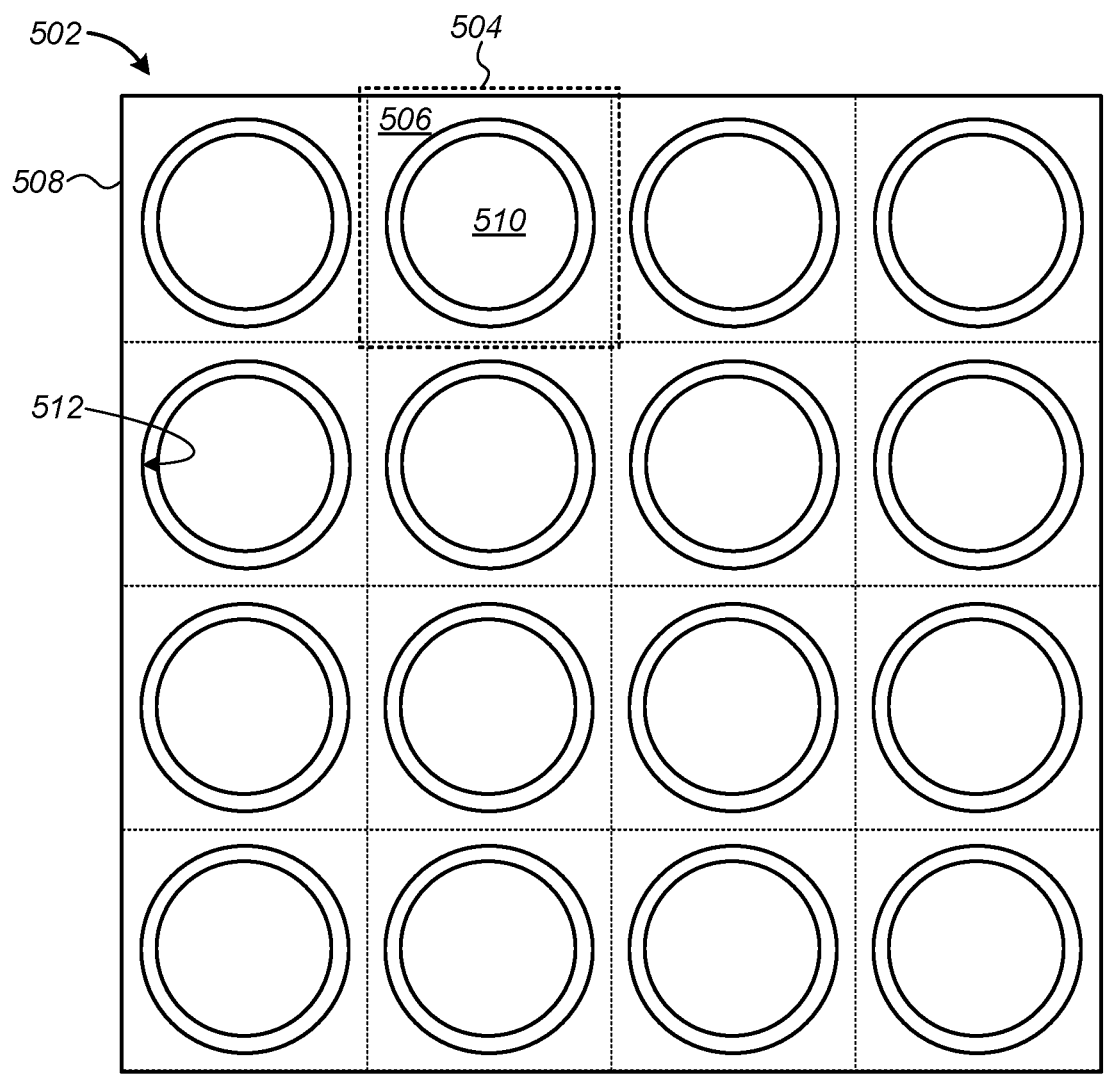
FIG. 5B is a schematic diagram of a top view of a single pixel in the array of the diffractive SLM of FIG. 5A including multiple modulators according to an embodiment of the present disclosure.

FIG. 5B is a schematic block diagram of a top view of a single pixel 502 in the array 500 of FIG. 5A. Referring to FIG. 5B according to an embodiment of the present disclosure each pixel 502, includes multiple, individual diffractors 504, each including a first light reflective surface 506 formed by a portion of a static face-plate 508 of the diffractive SLM, and a second light reflective surface 510 mechanically coupled to an electrostatically deflectable element (not shown in this figure) exposed through an aperture 512 in the face-plate 508. Generally, the size and position of the aperture 512 is chosen to satisfy an "equal reflectivity" constraint. That is a sum of the area of the second light reflective surfaces 510 in the each individual pixel 502 is substantially equal to the area of the first light reflective surfaces 506 on the face-plate 508 in the pixel. As with the embodiments described above in FIGS. 1A-1C, the face-plate 508 can be formed solely by a number of layers forming the first light reflective surface 506. Alternatively the face-plate 508 can further include a uniform, planar sheet of a dielectric or semiconducting material, for example a taut silicon-nitride or silicon-germanium layer, over or on which the first light reflective surface 506 is formed.

It is noted that a diffractive SLM including an array 500 with multiple pixels 502 each including sixteen (16) individual diffractors 504, as in the embodiment shown, would have a spatial period or pitch one quarter (¼) that of a previous embodiments of diffractive SLMs including a single diffractor per pixel. It is further noted however that this embodiment is for purposes of illustration only, and the each pixel 502 can alternatively include from four (4) to any number of multiple individual diffractors 504 mechanically coupled to be controlled by a single electrostatically deflectable element limited only by a lithography process used to form the diffractive SLM.

Figure 5C:
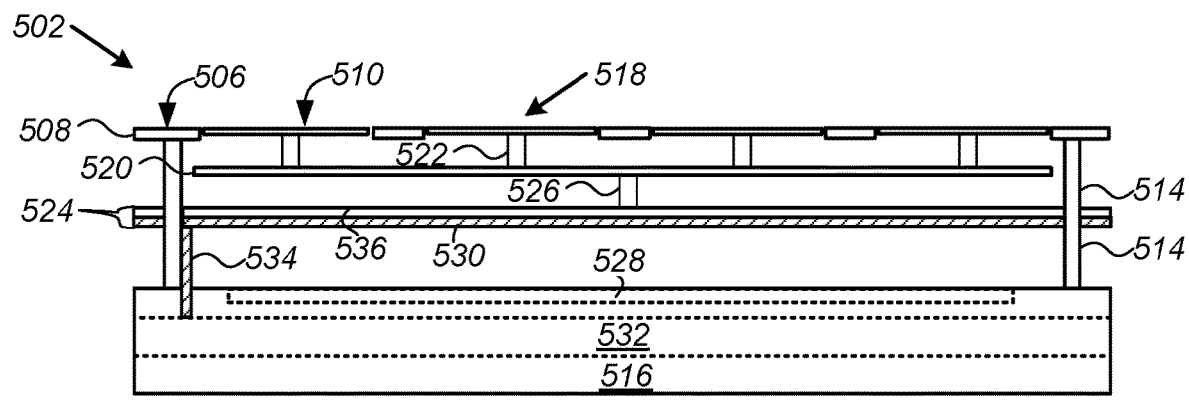
FIG. 5C is a schematic diagram of a sectional side of the pixel of FIG. 5B in a quiescent or undriven state.

An embodiment or structure for achieving this reduced spatial period or pitch without increasing the voltage required to drive the electrostatically deflectable elements of the diffractive SLM will now be described in greater detail with reference to FIGS. 5C and 5D. FIG. 5C is a schematic block diagram of a sectional side of the pixel of FIG. 5B in a quiescent or undriven state.

Referring to FIG. 5C, in the embodiment shown each pixel 502 further includes a number of posts 514 located at outer edges or corners of the pixel 502 to suspend the face-plate 508 above a substrate 516 on which the diffractive SLM is formed.

In the embodiment shown, each individual pixel 502 further includes a number of pistons 518, one for each individual diffractor 504, mechanically coupled to a platform layer 520 through a piston support 522 and an electrostatically deflectable element 524 or flexure mechanically coupled to the platform layer through a platform support 526. The pistons 518 can include solely a number of layers forming the second light reflective surface 510, or can further include a uniform, planar sheet of a dielectric or semiconducting material, for example a taut silicon-nitride or silicon-germanium layer, over or on which the second light reflective surface 510 is formed. The platform layer 520 can also include a uniform, planar sheet of one or more layers of dielectric or semiconducting material, for example a taut silicon-nitride or silicon-germanium layer. Piston supports 522 and platform support 526 are sized and shaped to enable the second light reflective surfaces 510 to be positioned co-planar with the first light reflective surfaces 506 in either the quiescent, undriven state (as shown) or a driven state. Preferably, the piston supports 522 and platform support 526 are further sized to adjust a gap between the electrostatically deflectable element 524 and a lower electrode 528 in or on a surface of the substrate 516 to improve a dynamic response of the diffractive SLM, dampen oscillations of the electrostatically deflectable element, and reducing a maximum drive voltage while also providing a required range of movement of the second light reflective surfaces 510, typically about ¼ of a wavelength of the incident light, and providing a sufficient margin to snap-down. By snap-down it is meant a potentially destructive condition in which the electrostatically deflectable element 524 comes into contact with and sticks to the lower electrode 528 or surface of the substrate 516.

Additionally, the second light reflective surfaces 510, piston supports 522, platform layer 520 and platform support 526 are sized and shaped to reduce the mass of the pistons 518 and platform layer moved by the electrostatically deflectable element 524 improving a response time of the diffractive SLM to changing drive signals, and providing higher thermal conductivity and larger passageways for flow of a cooling gas, thereby enabling a diffractive SLM including pixels with multiple individual diffractors to be used with higher powered lasers.

The electrostatically deflectable element 524 can include an electrode layer 530 electrically coupled to an electrical ground or to a drive circuit 532 integrally formed in or on the substrate 516 through electrically conductive vias 534 formed in or over one or more of the posts 514 by which the electrostatically deflectable element 524 is supported above the substrate. The electrode layer 530 can be formed from a metal or other conductive material, such as a doped polycrystalline silicon, formed on a mechanical layer 536, for example a taut silicon-nitride or silicon-germanium layer. Alternatively, when silicon-germanium is used as a material of the mechanical layer 536, use of a separate electrode layer to form an electrode in the electrostatically deflectable element 524 is not necessary as the silicon-germanium mechanical layer is itself a semiconductor and can serve as the electrode in the electrostatically deflectable element.

Figure 5D:
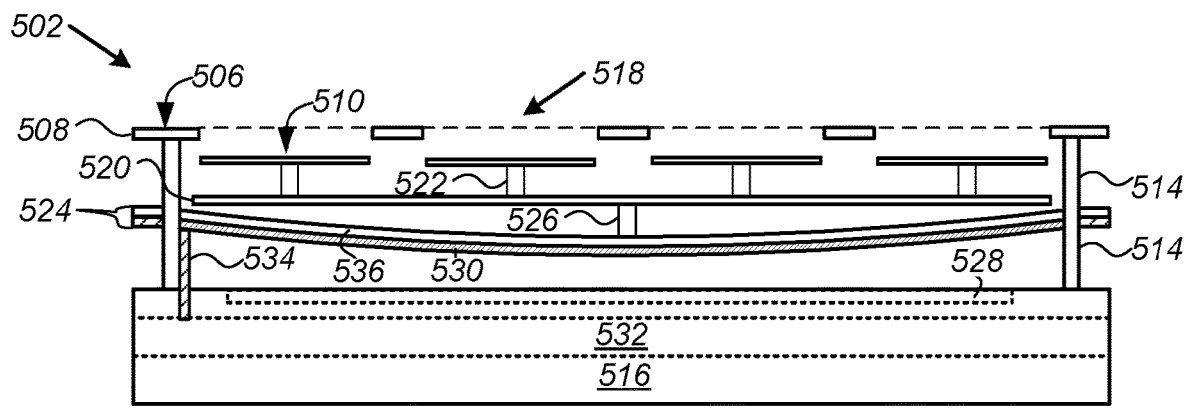
FIG. 5D is a schematic diagram of a sectional side of the pixel of FIG. 5B in a deflected or driven state.

FIG. 5D is a schematic block diagram of a sectional side of the pixel of FIGS. 5B and 5C in a deflected or driven state. Referring to FIG. 5D, in operation light reflected from the second light reflective surfaces 510 is brought into constructive or destructive interference with light reflected from the first light reflective surfaces 506 by deflection of the electrostatically deflectable element 524 towards the lower electrode 528. It will be understood that because all the diffractors 504 within a single pixel 502 are mechanically coupled or ganged together through the platform layer 520 to a physically larger electrostatically deflectable element 524, voltage required to drive the pixel is maintained at the same level used to drive a single diffractor pixel, or reduced to a level of less than about 25V, which can be achieved in drive circuits with commonly available HV transistors of modest footprint, thereby enabling the drive circuit 532 to fit in the footprint or space underlying the array 500 of diffractors 504 of the diffractive SLM.

Figure 6:
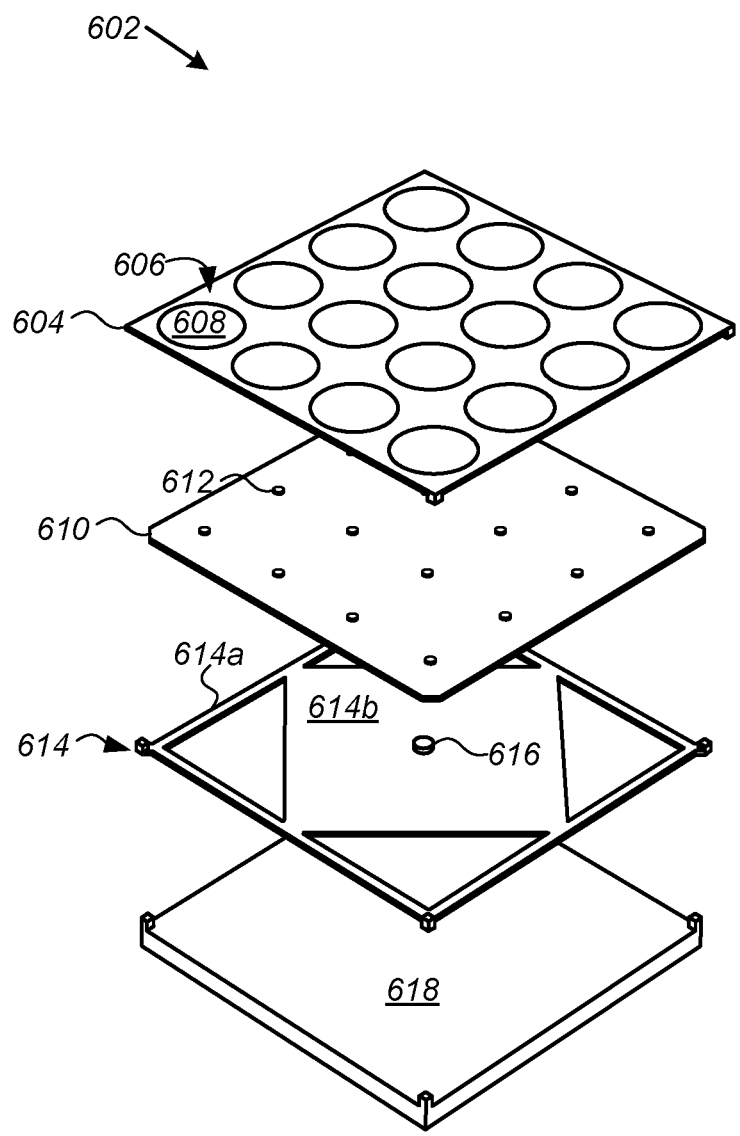
FIG. 6 is an exploded, perspective view of a substrate and layers of a single pixel, including movable light reflective surfaces capable of being positioned co-planar with a static light reflective surface according to an embodiment of the present disclosure.

An exploded, perspective view of the layers and elements of a single pixel, including movable light reflective surfaces capable of being positioned co-planar with a static light reflective surface is shown in FIG. 6. Referring to FIG. 6, the pixel 602 generally includes a static face-plate 604 including a first light reflective surface 606, and a plurality of second light reflective surfaces 608; a platform layer 610 mechanically coupled to the second light reflective surfaces through a number of piston supports 612; and an electrostatically deflectable layer 614 mechanically coupled to the platform layer through a platform support 616 and including a number of flexures 614a by which an electrostatically deflectable element 614b is suspended above a substrate 618.

Figure 7A:
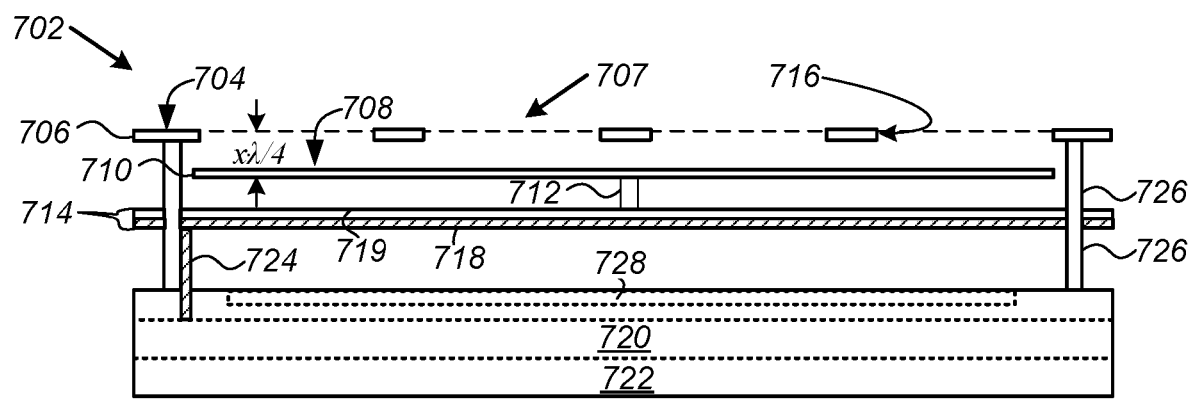
FIG. 7A is a schematic block diagram of a sectional side of the portion of the pixel of a diffractive SLM including non-coplanar static and movable light reflective surfaces according to another embodiment of the present disclosure in a quiescent or undriven state.
Figure 7B:
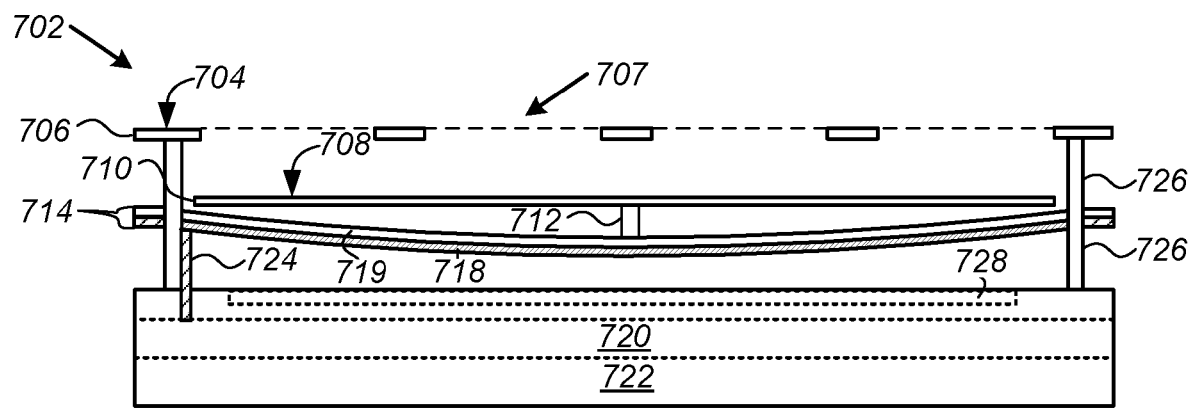
FIG. 7B is a schematic block diagram of a sectional side of the portion of the pixel of the diffractive SLM of FIG. 7A in a deflected or driven state.
Figure 8:
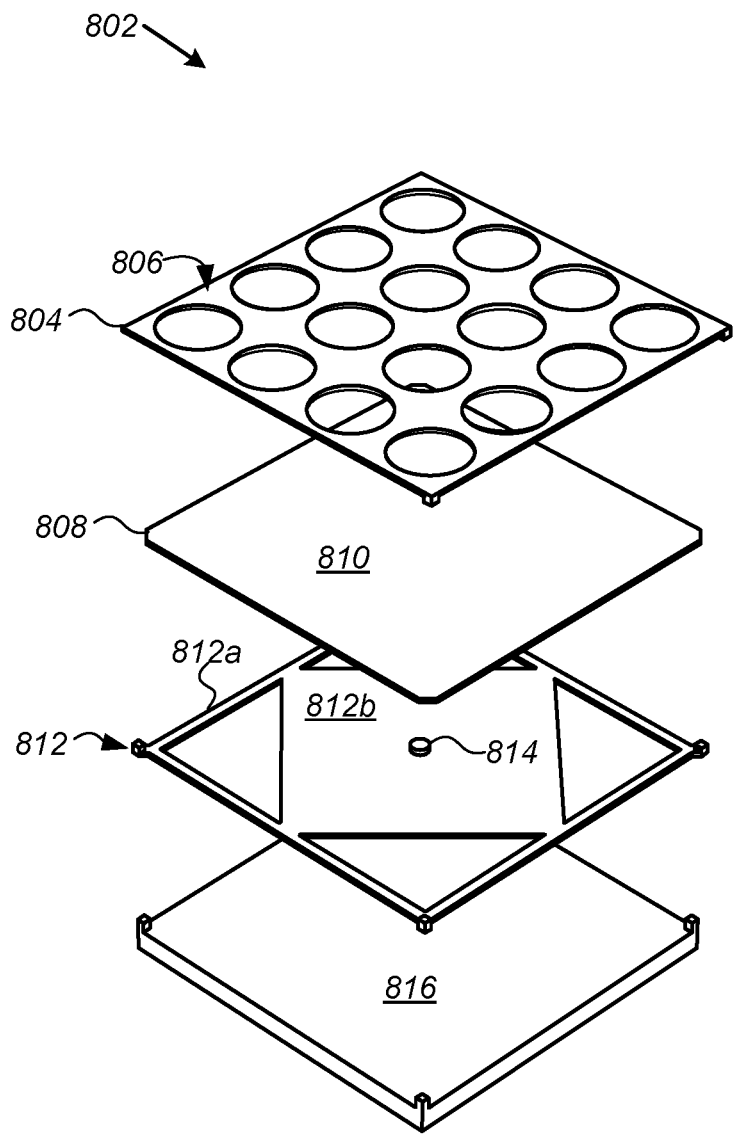
FIG. 8 is an exploded, perspective view of a substrate and layers of a single pixel, including non-coplanar static and movable light reflective surfaces according to another embodiment of the present disclosure.

In another embodiment, a diffractive SLM according to the present disclosure can include non-coplanar static and movable light reflective surfaces, as illustrated in FIGS. 7A, 7B and 8.

FIG. 7A is a schematic block diagram of a sectional side of the portion of a pixel 702 of a diffractive SLM including a first light reflective surface 704 formed on a static face-plate 706, and a second light reflective surface 708 on a platform layer 710 mechanically coupled through a platform support 712 to an electrostatically deflectable element 714. Portions of the second light reflective surface 708 are exposed through apertures 716 in the face-plate 706 to form individual diffractors 707. As with the embodiments described above, the number and size of apertures 716 are selected so that a sum of the area of the portion of the second light reflective surface 708 exposed in the each individual pixel 702 is substantially equal to the area of the first light reflective surfaces 704 on the face-plate 706 in the pixel. Generally the first light reflective surface 704 and second light reflective surface 708 are separated in a quiescent or undriven state by a distance equal to a multiple of one quarter wavelength (λ) of an incident light. For example, where the first and second light reflective surfaces 704, 708 are separated in the quiescent state by an odd number multiple of the incident light, i.e., ¼, or ¾λ, the light reflected from the first and second light reflective surfaces will destructively interfere at a first order diffraction angle, to yield a 'dark' pixel. Conversely, where the first and second light reflective surfaces 704, 708 are separated in the quiescent state by an even number multiple of the incident light, i.e., ½·λ or 1·λ, the light reflected from the first and second light reflective surfaces will constructively interfere at a first order diffraction angle, to yield a 'light' pixel.

FIG. 7B is a schematic block diagram of a sectional side of the pixel of FIG. 7A in a deflected or driven state. Referring to FIG. 7B, in operation an electrode or electrode layer 718 underlying a mechanical layer 719 in the electrostatically deflectable element 714 is electrically coupled to a drive circuit 720 integrally formed in or on a substrate 722 through electrically conductive vias 724 formed in or over one or more of posts 726 by which the electrostatically deflectable element and face-plate 706 are supported above the substrate. The electrode layer 718 in the electrostatically deflectable element 714 is deflected towards a lower electrode 728 in the substrate 722 when a voltage is applied therebetween.

As with the embodiments of FIGS. 5C-5D described above, the second light reflective surfaces 708, platform layer 710 and platform support 712 are sized and shaped to reduce the mass that must be moved by the electrostatically deflectable element 714, improving a response time of the diffractive SLM to changing drive signals, and providing increased thermal conductivity and larger passageways for flow of a cooling gas, thereby enabling a diffractive SLM including pixels with multiple individual diffractors to be used with higher powered lasers. Additionally, because all diffractors 707 within a single pixel 702 are ganged together under control of a single electrode layer in the larger electrostatically deflectable element 714, voltage required to drive the pixel is maintained or reduced to a level, which can be achieved in drive circuits lower voltage transistors, thereby enabling the drive circuit 720 to fit in the footprint or space underlying an array of the diffractive SLM.

FIG. 8 is an exploded, perspective view of a substrate and layers of a single pixel, including non-coplanar static and movable light reflective surfaces. Referring to FIG. 8, the pixel 802 generally includes a static face-plate 804 including a first light reflective surface 806, a platform layer 808 including a second light reflective surfaces 810, and an electrostatically deflectable layer 812 mechanically coupled to the platform layer through a platform support 814 and including a number of flexures 812a by which an electrostatically deflectable element 812b is suspended above a substrate 816.

A process flow for fabricating a diffractive SLM including a number of pixels, each with multiple modulators according to an embodiment of the present disclosure will now be described with reference to FIGS. 9A through 9H, where FIGS. 9A through 9H are schematic block diagrams of a sectional side of a single pixel 500 of a diffractive SLM including multiple diffractors in each pixel at various stages or steps in a fabrication process according to an embodiment of the present disclosure.

Figure 9A:
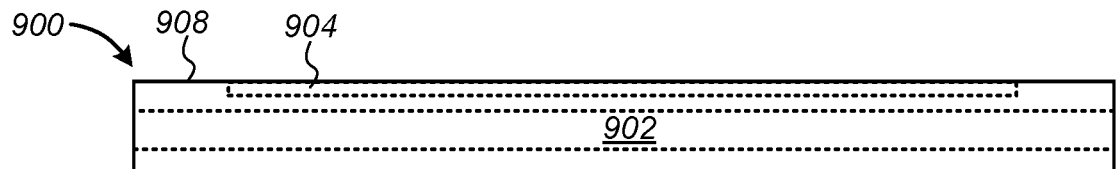
FIGS. 9A through 9H are schematic diagrams illustrating a process flow for fabricating a diffractive SLM including a number of pixels, each with multiple modulators according to an embodiment of the present disclosure.

Referring to FIG. 9A, the process begins with a drive circuit 902 and a lower electrode 904 having been formed in a substrate 906. Generally, the drive circuit 902 includes one or more includes digital to analog converters, sample-and-hold stages and output voltage amplifiers or stages, and can be formed, for example, using complementary metal-oxide-semiconductor (CMOS) technology on a surface of the substrate 906. Preferably, as in the embodiment shown the drive circuit 902 once formed is overlaid by an interlevel dielectric (ILD 908), such as a silicon oxide or silicon nitride, in which the lower electrode 904 is formed and over which the pixel 900 is subsequently formed.

Figure 9B:
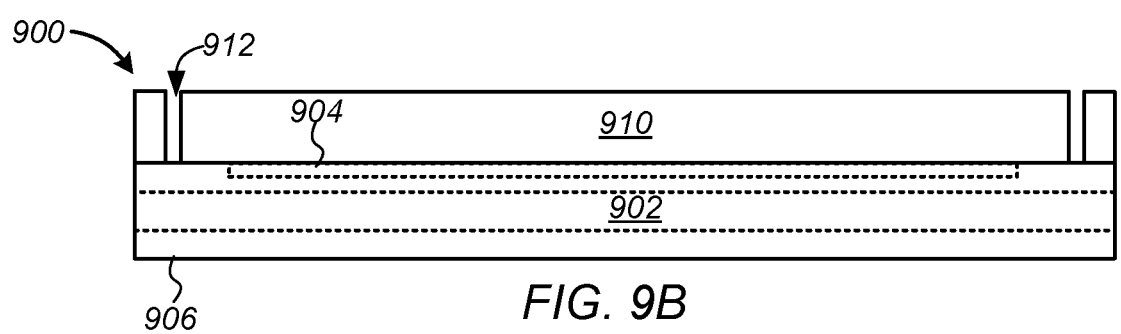

Next, referring to FIG. 9B a first sacrificial layer 910 is formed over the ILD 908 and the lower electrode 904, and patterned to form openings 912 for posts to support a face-plate and flexures of an electrostatically deflectable layer of the pixel 902. Suitable materials for the first sacrificial layer 910 can include germanium (Ge), and amorphous or polycrystalline silicon, and can be deposited using any semiconductor or MEMS fabrication technology including, for example, chemical vapor deposition (CVD), plasma enhanced CVD (PECVD), and atomic layer deposition (ALD). After deposition of the first sacrificial layer 910 a patterned mask layer (not shown) is formed over the first sacrificial layer and the first sacrificial layer is partially etched to form the openings 912 shown in FIG. 9B. The mask layer can include a hardmask of a dielectric material, such as silicon nitride or oxide, or a photoresist mask, and is deposited and patterned using standard photolithographic techniques. The first sacrificial layer 910 can be etched using a wet or dry etch, and a etch chemistry selective to materials of the substrate 906 and masking layer.

Figure 9C:
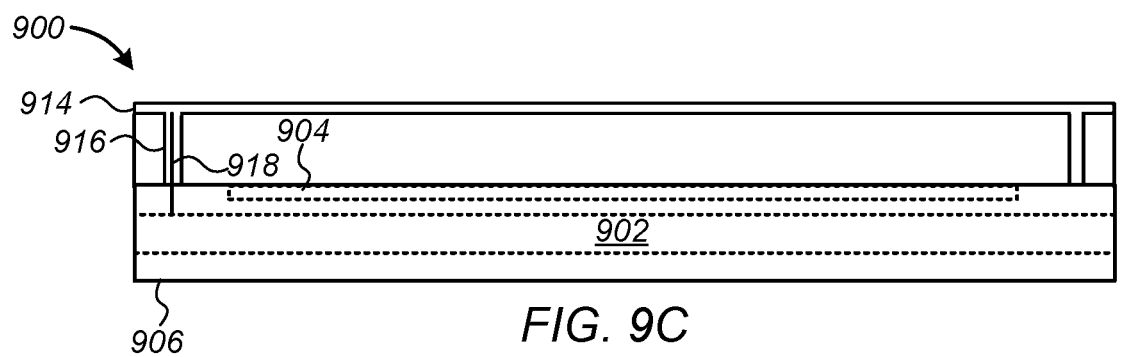

Referring to FIG. 9C, the process continues with formation of an electrostatically deflectable layer 914. As noted above the electrostatically deflectable layer 914 can include one or more layers of dielectric, semiconducting or conductive material to a form a mechanical layer and an electrode layer. Suitable materials for the mechanical layer include, for example, a taut silicon-nitride or silicon-germanium layer. Suitable materials for the electrode layer include a metal or other conductive material, such as a doped polycrystalline silicon. Alternatively, when silicon-germanium is used as a material of the mechanical layer, use of a separate electrode layer to form an electrode in the electrostatically deflectable layer 914 is not necessary as the silicon-germanium mechanical layer is itself conductive. The mechanical layer and the electrode layer, where included, can be deposited using any semiconductor or MEMS fabrication technology including, for example, CVD, PECVD, and ALD. Preferably, as in the embodiment shown, the openings 912 are concurrently filled with the same material used to form the mechanical layer to form posts 916. Once the posts 916 are formed and the mechanical layer deposited it is patterned to form and flexures coupling an electrostatically deflectable element to posts 916. More preferably, where conductive vias 918 are to be formed in one or more of the posts 916, opening(s) for the conductive vias are etched simultaneously with pattern of the mechanical layer to form the flexures and the opening(s) filled simultaneously with deposition of the electrode layer. The mechanical layer is patterned and opening(s) for the conductive vias 918 formed using a photoresist mask or hardmask, standard photolithographic techniques, and wet or dry etch techniques.

Figure 9D:
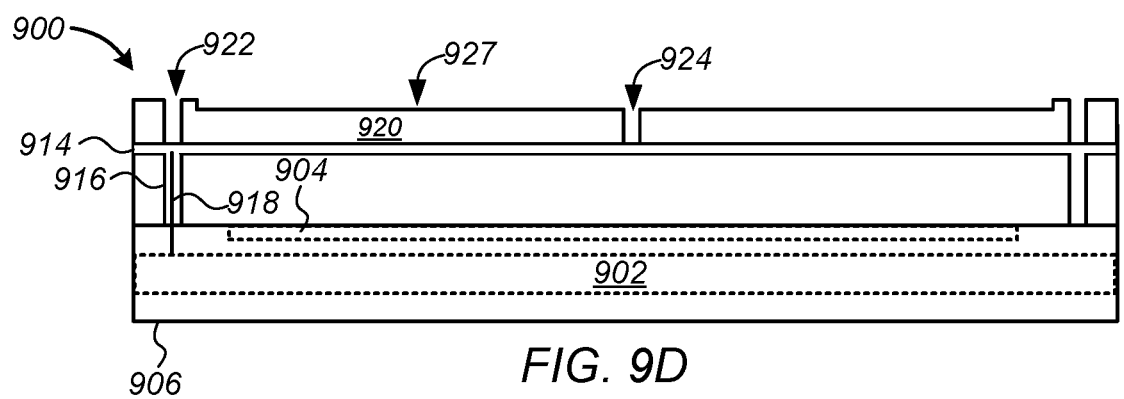

Next, referring to FIG. 9D, a second sacrificial layer 920 is deposited and patterned to form openings 922 to extend posts 916, an opening 924 for a platform support 926, and an opening 927 for a platform layer 928. Suitable materials for the second sacrificial layer 920 can include Ge, and amorphous or polycrystalline silicon, and can be deposited using CVD, PECVD or ALD. Preferably, second sacrificial layer 920 includes the same material as the first sacrificial layer 910 to facilitate subsequent simultaneous release of the electrostatically deflectable layer 914 and the platform layer 928. The second sacrificial layer 920 is patterned using a photoresist mask or hardmask, standard photolithographic and wet or dry etch techniques.

Figure 9E:
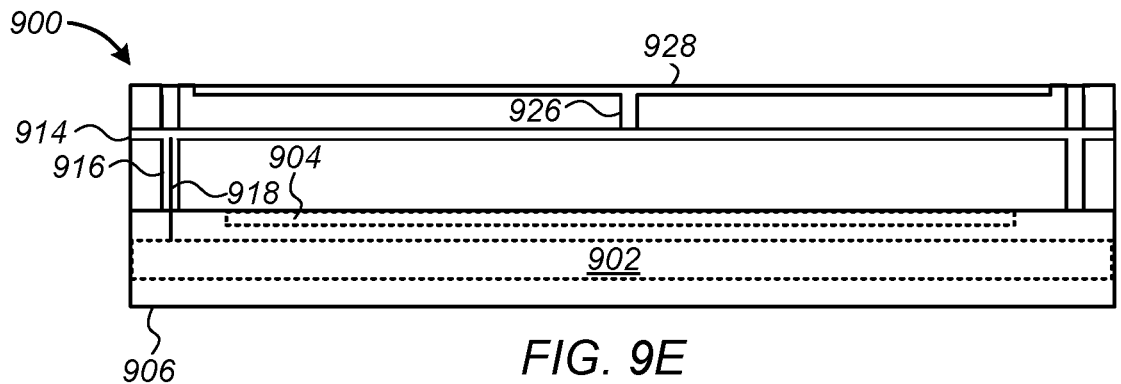

Referring to FIG. 9E, the process continues with deposition of a dielectric or semiconducting material to fill the openings 922, 924 and 927 to extend the posts 916 and form the platform support 926, and platform layer 928. As with the mechanical layer of the electrostatically deflectable layer 914, suitable materials for the forming posts 916, the platform support 926 and platform layer 928 can include silicon-nitride or silicon-germanium deposited, for example, using CVD, PECVD, and ALD.

Figure 9F:
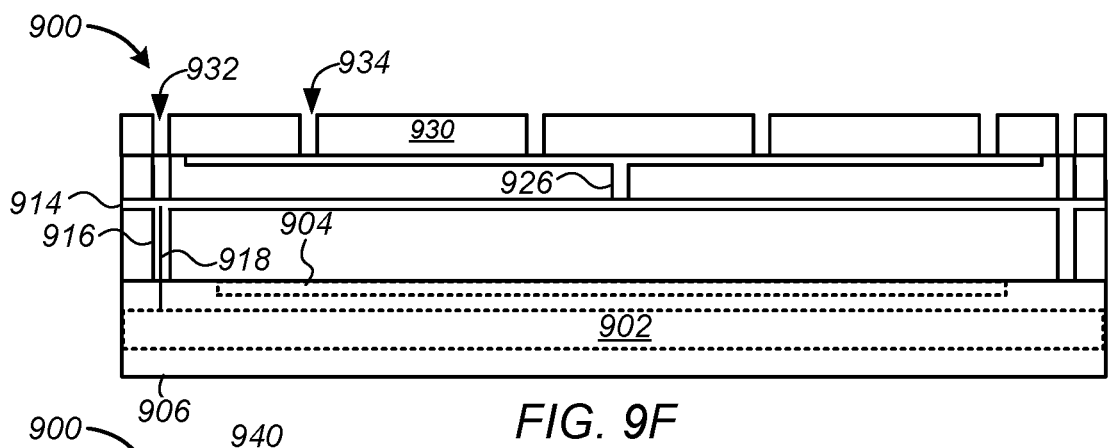

Next, referring to FIG. 9F a third sacrificial layer 930 is deposited and patterned to form openings 932 to extend posts 916 and openings 934 for piston supports 936. Suitable materials for the third sacrificial layer 930 can include Ge, and amorphous or polycrystalline silicon deposited using CVD, PECVD or ALD. Preferably, the third sacrificial layer 930 includes the same material as the first and second sacrificial layers 910, 920 to facilitate subsequent simultaneous removal of the sacrificial layers. The third sacrificial layer 930 is patterned using a photoresist mask or hardmask, and standard photolithographic and wet or dry etch techniques.

Figure 9G:
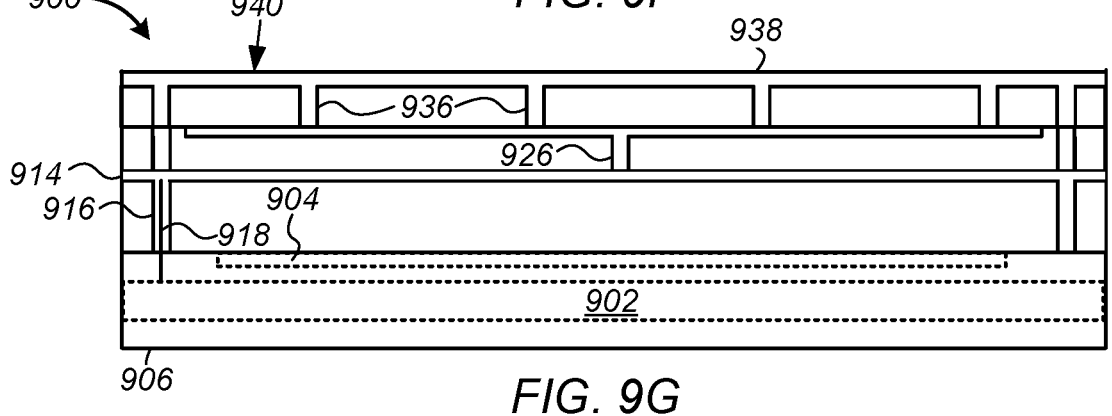

Referring to FIG. 9G, the process continues with deposition of a dielectric or semiconducting material to fill the openings 932, 934 to extend the posts 916 and form the piston supports 936, and to form layer 938 on which a reflective surface 940 is formed, and which is subsequently patterned to form a face-plate 942 and pistons 944. As with the mechanical layer of the electrostatically deflectable layer 914 and platform layer 928 suitable materials for filling the openings 932, 934 and forming layer 938 include a taut silicon-nitride or silicon-germanium deposited, for example, using CVD, PECVD, and ALD.

Figure 9H:
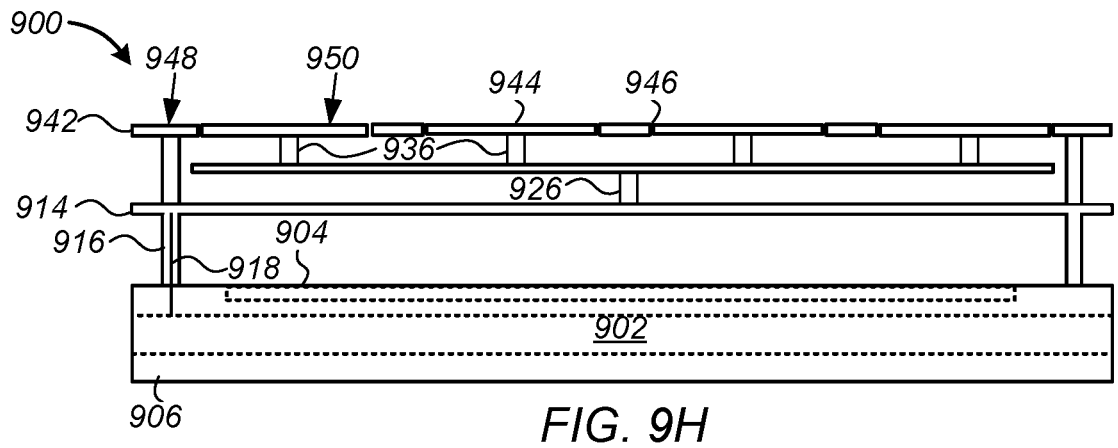

Referring to FIG. 9H layer 938 is then patterned using a photoresist mask or hardmask, and standard photolithographic and wet or dry etch techniques to form apertures 946 forming the face-plate 942 including first light reflective surfaces 948 and pistons 944 including second light reflective surfaces 950. Finally, the first, second and third sacrificial layers 910, 920, 930, are removed or etched to release the pistons 944, platform layer 928 and electrostatically deflectable layer 914. The f sacrificial layers 910, 920, 930 can be etched using a wet or dry etch, and a etch chemistry selective to materials of the substrate 906, electrostatically deflectable layer 914, platform layer 928 and layer 938.

Figure 10:
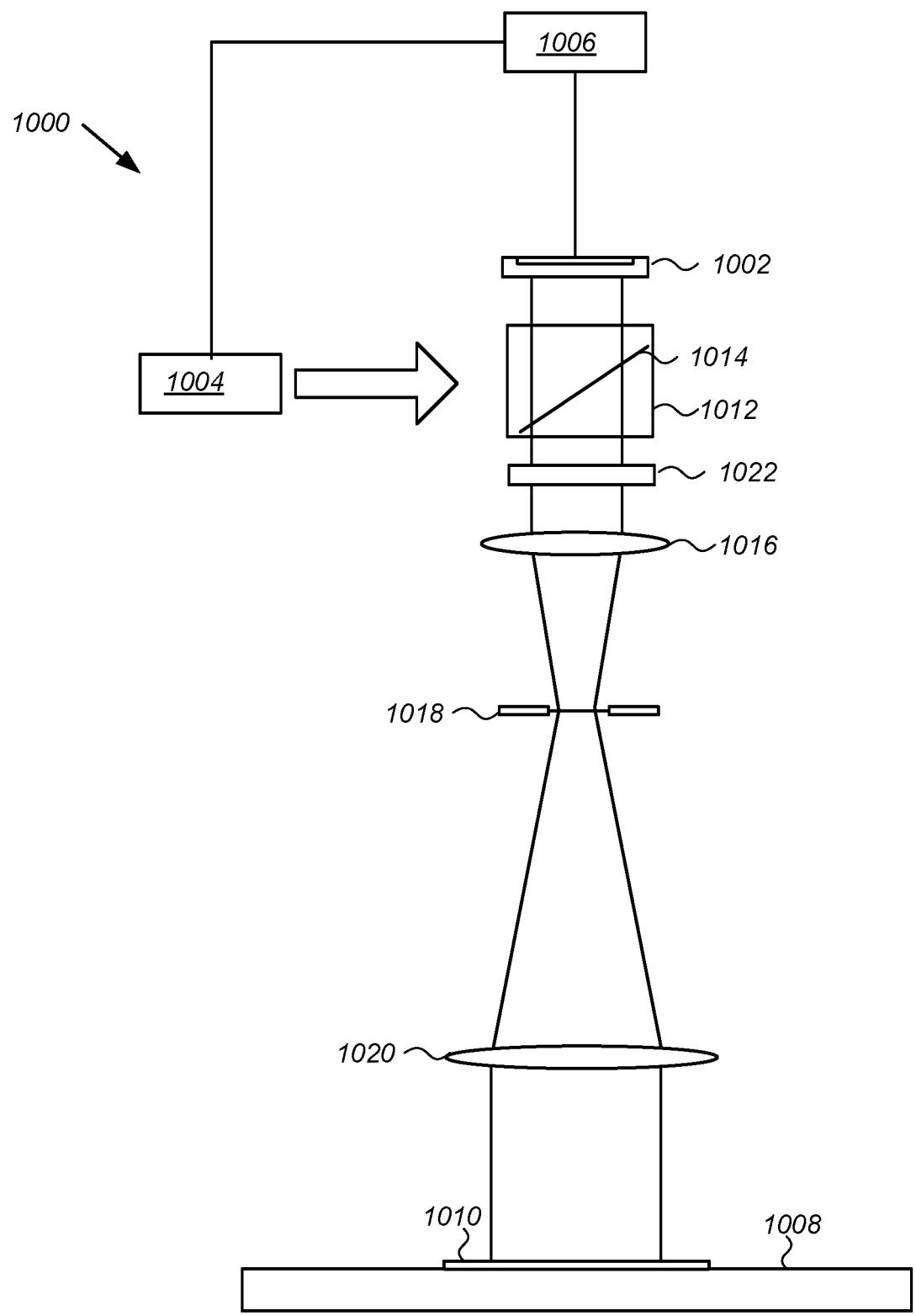
FIG. 10 is a schematic block diagram of an embodiment of a laser processing system including a diffractive SLM with a number of pixels, each with multiple modulators according to an embodiment of the present disclosure.

An embodiment of a system including a diffractive SLM including pixels with multiple diffractors suitable for use in a laser marking or lithography manufacturing processes will now be described with reference to FIG. 10. Generally, a laser processing system includes a MEMS-based including a diffractive SLM with a number of pixels, each with multiple diffractors to modulate a beam of light generated by a laser. Referring to FIG. 10, the laser processing system 1000 includes a MEMS-based diffractive SLM 1002, a high powered, CW, or nano-, pico- or femto-second pulsed laser 1004, imaging optics and illumination optics, a controller 1006 to provide voltages to drive the MEMS-based SLM and control operation of the laser 1004 and a workpiece support 1008 to hold a target workpiece 1010.

Generally, the illumination optics include a number of elements including lenses, mirrors and prisms, designed to transfer a light beam from the laser 1004, such as an Ultra Violet laser, to the diffractive SLM 1002 to illuminate an area substantially equal to that of the reflective surface of the diffractive SLM. In the embodiment shown, the illumination optics include a polarizing beam splitter (PBS) 1012, which reflects light having a first polarization onto the diffractive SLM 1002, and transmits the light having a second polarization from the diffractive SLM towards the target workpiece 1008, such as a target wafer, through the imaging optics. For example, the PBS 1012 can be adapted to reflect light having a Transverse-Electric (TE) polarization towards the diffractive SLM 1002, and to transmit light having a Transverse-Magnetic (TM) polarization toward the target workpiece 1008. The light that is initially directed toward the MEMS-based SLM 1002 by the PBS 1012 in the TE state will pass twice through a quarter-wave plate (QWP) 1014, thus converting it to TM polarization and allowing to pass through the PBS and on to the imaging optics that follow.

As shown, the imaging optics can further include magnification and filtering elements, such as a first Fourier Transform (FT) lens 1016 to focus and direct light from the PBS 1012 onto a FT filter 1018 to select the 0th order modulated light, and a second, larger Inverse FT lens 1020 to enlarge the image generated by the SLM 1002 and project it onto the target workpiece 1008.

In another embodiment, the laser processing system 1000 of FIG. 10 further includes an element or elements, such as a crystal 1022, to vary an intensity of phase modulated light or convert phase modulated light to an intensity modulation.

In yet another aspect, the present disclosure is directed to a processing system including a MEMS-based diffractive SLM with a number of pixels, each with multiple diffractors suitable for use in additive three dimensional (3D) printing systems. 3D printing systems can use either a photopolymerization technology or Selective laser sintering (SLS). In photopolymerization is a liquid photopolymer or resin is exposed to a modulated beam of light that converts the liquid into a solid, building an object to be printed from a series of two-dimensional layers. Selective laser sintering involves melting and fusing together of fine, typically metal, particles using a high power laser to build successive cross-sections of an object.

Figure 11:
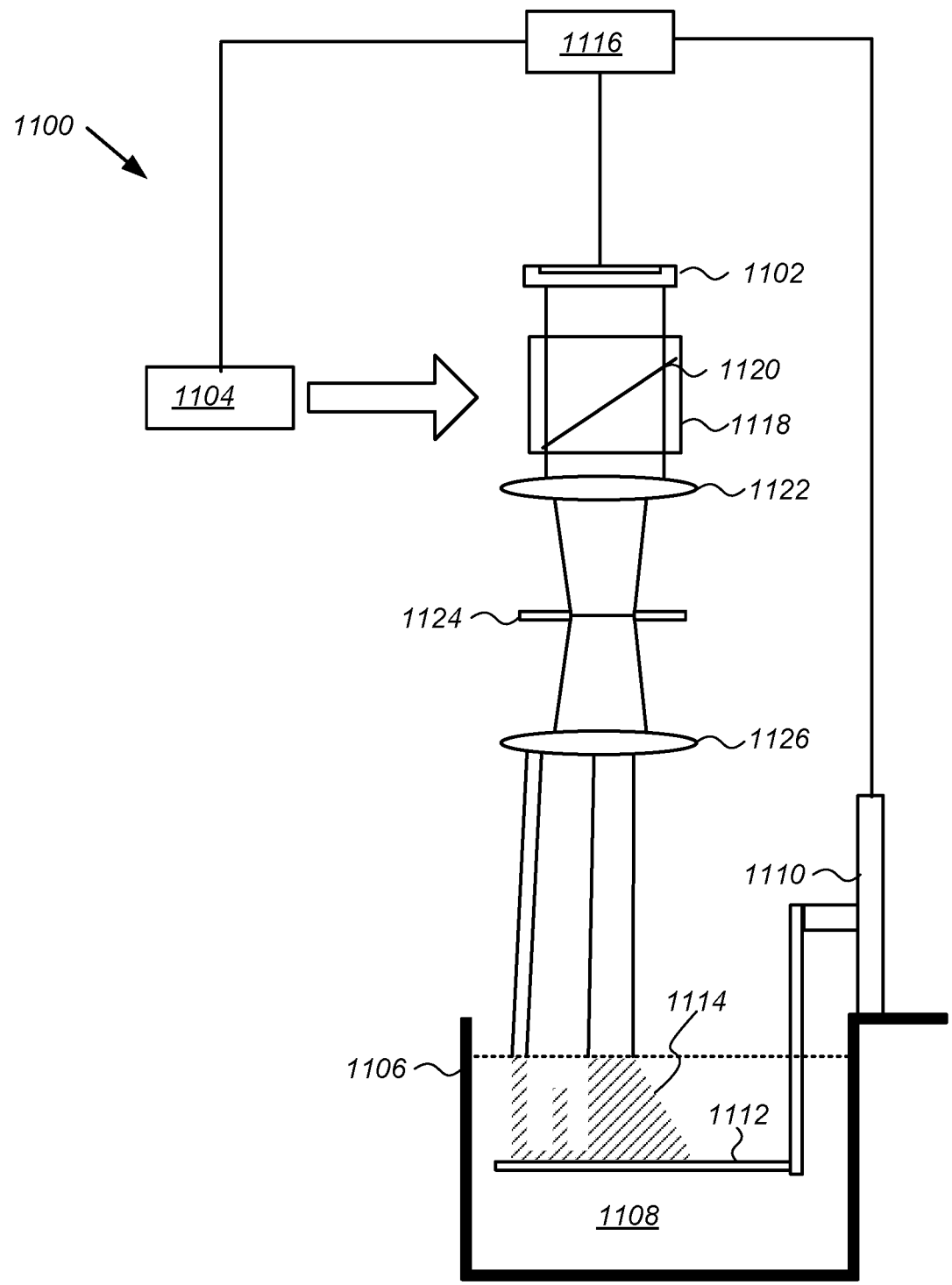
FIG. 11 is a schematic block diagram of an additive three-dimensional (3D) printing system including a diffractive SLM with a number of pixels, each with multiple modulators according to an embodiment of the present disclosure.

An embodiment of a polymerization three-dimensional (3D) printing system will now be described with reference to FIG. 11. Generally, the 3D printing system 1100 includes a MEMS-based diffractive SLM 1102 with a number of pixels, each with multiple diffractors to modulate a beam of light generated by a laser 1104, a vat 1106 containing the photopolymer or resin 1108, and a transport mechanism 1110 to raise and lower a work surface 1112 on which an object 1114 is printed into the vat. Referring to FIG. 11, the 3D printing system 1100 further includes illumination optics to transfer light from the laser 1104 to the SLM 1102, imaging optics to transfer modulated light from the SLM toward the work surface 1112, a controller 1116 control operation of the laser, SLM and transport mechanism 1110 to hold the target workpiece or object 1114. In the embodiment shown, the illumination optics include a polarizing beam splitter (PBS) 1118 including a quarter-wave plate (QWP) 1120, which reflects light having a first polarization onto the SLM 1102, and transmits the light having a second polarization from the SLM towards work surface 1112 through the imaging optics.

As shown, the imaging optics can include magnification and filtering elements, such as a first Fourier Transform (FT) lens 1122 to focus and direct light from the PBS 1118 onto a FT filter 1124 to select the 0th order modulated light, and a second, larger Inverse FT lens 1126 to enlarge the image generated by the SLM 1102 and project it onto a surface of the resin 1108 immediately above or adjacent to the work surface 1112.

The transport mechanism 1110 is adapted and controlled by the controller 1116 to lower the work surface 1112 into the vat 1106 as the modulated light converts the resin 1108 into a solid, building successive layers or cross-sections of the object 1114 to be printed. Generally, the layers can be from about 100 µm to 1 mm thick. Optionally, the transport mechanism 1110 can be further adapted to move or reposition the work surface 1112 laterally to enable simultaneous printing of multiple objects or objects larger than the area imaged onto the work surface.

Thus, embodiments of MEMS-based diffractive SLMs having improved étendue, and methods of fabricating and operating the same in various processing systems have been described. Although the present disclosure has been described with reference to specific exemplary embodiments, it will be evident that various modifications and changes may be made to these embodiments without departing from the broader spirit and scope of the disclosure. Accordingly, the specification and drawings are to be regarded in an illustrative rather than a restrictive sense.

The Abstract of the Disclosure is provided to comply with 37 C.F.R. § 1.72(b), requiring an abstract that will allow the reader to quickly ascertain the nature of one or more embodiments of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

Reference in the description to one embodiment or an embodiment means that a particular feature, structure, or characteristic described in connection with the embodiment is included in at least one embodiment of the circuit or method. The appearances of the phrase one embodiment in various places in the specification do not necessarily all refer to the same embodiment.

What is claimed is:

1. A spatial light modulator (SLM) including a number of pixels, each pixel comprising:
   an electrostatically deflectable layer suspended over a surface of a substrate by corner posts at corners thereof, the electrostatically deflectable layer including an electrostatically deflectable element and a number of flexures through which the element is coupled to the posts;
   a platform supported above and separated from the electrostatically deflectable element by a platform support extending from the electrostatically deflectable element to the platform;
   a single, contiguous first light reflective surface formed on a top surface of the platform, and extending substantially over the entire top surface of the platform; and
   a face-plate suspended over the platform, the face-plate including a second light reflective surface on a top surface thereof, and a plurality of apertures through each of which different portions of the first light reflective surface is exposed,
   wherein electrostatic deflection of the electrostatically deflectable element brings light reflected from the first light reflective surface into constructive or destructive interference with light reflected from the second light reflective surface.

2. The SLM of claim 1, wherein a number, size and shape of the plurality of apertures is selected to define an area of number of first light reflective surfaces substantially equal to a reflectivity of an area of the second light reflective surface surrounding the plurality of apertures.

3. The SLM of claim 2, wherein the single, contiguous first light reflective surface is non-coplanar with the second reflective surface.

4. The SLM of claim 3, wherein a plane of the single, contiguous first light reflective surface is separated from a plane of the second reflective surface by distance equal to about a multiple of one quarter wavelength of light reflected from the first and second light reflective surface when the when the electrostatically deflectable element is in a quiescent state.

5. The SLM of claim 1, wherein the SLM comprises an array of the pixels, each pixel comprising a plurality of diffractors, each diffractor comprising one of the plurality of apertures and a portion of the second light reflective surface surrounding the aperture, wherein an area of the portion of the second light reflective surface surrounding the aperture is substantially equal to an area of the first light reflective surface exposed by the aperture.

6. The SLM of claim 5, wherein a spatial period (Λ) of the plurality of diffractors within a single pixel is a multiple m of a pitch of the pixels in the array, where m ranges from 2-200 times.

7. The SLM of claim 6, further comprising a plurality of drivers formed in the substrate underlying the array of pixels, wherein each pixel is driven by one of the plurality of drivers, and wherein a pitch of the plurality of drivers is equal to the pitch of the pixels in the array.

8. The SLM of claim 5, wherein a spatial period (Λ) of the plurality of diffractors within a single pixel is a multiple n of a wavelength (λ) of light incident on the SLM where n ranges from 1-200.

9. A system for additive manufacturing comprising the SLM of claim 1 to modulate a beam of light generated by a laser, the system further comprising:
a vat into which material being added together is introduced;
a transport mechanism to raise and lower a work surface on which an object is manufactured into the vat;
imaging optics to transfer modulated light from the SLM toward the work surface; and
a controller to control operation of the laser, SLM and transport mechanism.

10. A spatial light modulator (SLM) including a number of pixels, each pixel comprising:
an electrostatically deflectable layer suspended over a surface of a substrate by corner posts at corners thereof, the electrostatically deflectable layer including a single electrostatically deflectable element and a number of flexures through which the electrostatically deflectable element is coupled to the posts;
a platform supported above and separated from the electrostatically deflectable element by a platform support extending from the electrostatically deflectable element to the platform;
a plurality of pistons each including a first light reflective surface on a top surface thereof supported above and separated from the platform by piston supports extending from the platform to each piston; and
a face-plate suspended over the platform, the face-plate including a second light reflective surface on a top surface thereof, and a plurality of apertures through which the first light reflective surface on each of the plurality of pistons is exposed,
wherein electrostatic deflection of the of the single electrostatically deflectable element causes the first light reflective surface on the top surface of each of the plurality of pistons to be displaced relative to the second light reflective surface.

11. The SLM of claim 10, wherein the first light reflective surface on the top surface of each of the plurality of pistons are coplanar with the second reflective surface of the face-plate when the electrostatically deflectable element is in a quiescent state.

12. The SLM of claim 10, wherein the SLM comprises an array of the pixels, each pixel comprising a plurality of diffractors, each diffractor comprising one of the plurality of apertures and a portion of the second light reflective surface surrounding the aperture, wherein an area of the portion of the second light reflective surface surrounding the aperture is substantially equal to an area of the first light reflective surface exposed by the aperture.

13. The SLM of claim 12, wherein a spatial period (Λ) of the plurality of diffractors within a single pixel is a multiple m of a pitch of the pixels in the array, where m ranges from 2-200 times.

14. The SLM of claim 10, further comprising a plurality of drivers formed in the substrate underlying the array of pixels, wherein each pixel is driven by one of the plurality of drivers, and wherein a pitch of the plurality of drivers is equal to the pitch of the pixels in the array.

* * * * *